June 4, 1946.    J. MIHALYI ET AL    2,401,707
RANGE FINDER
Filed March 13, 1943
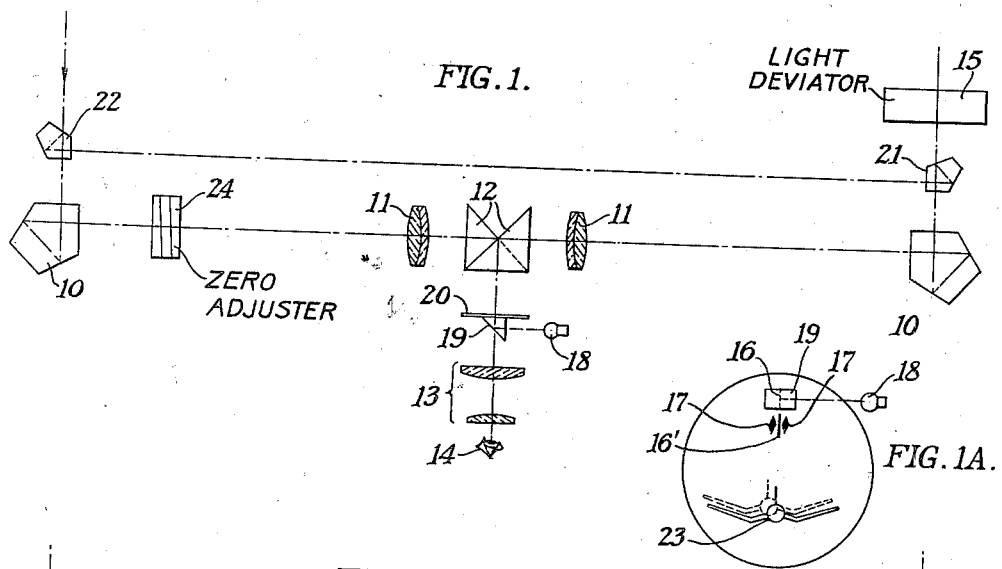
FIG. 1.
FIG. 1A.
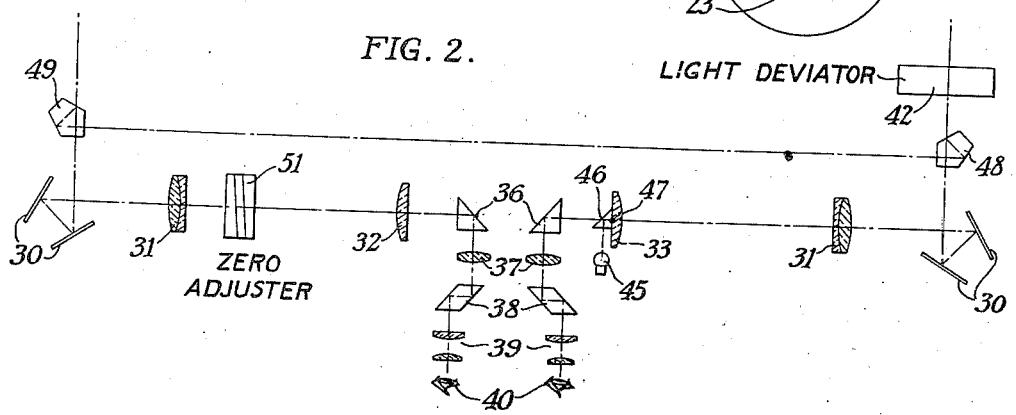
FIG. 2.
FIG. 2A.
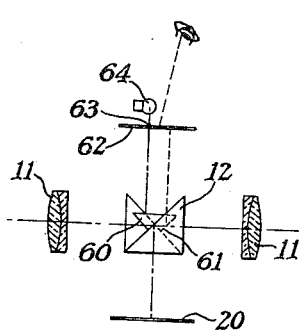
FIG. 3.
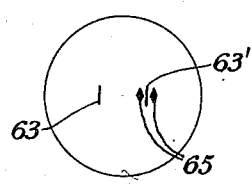
FIG. 3A.
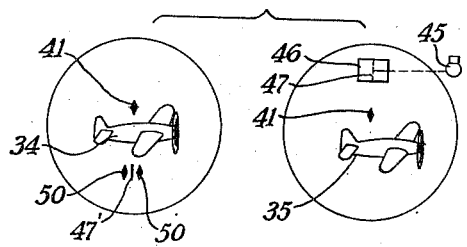
JOSEPH MIHALYI
STEPHEN M. MACNEILLE
INVENTORS
BY
ATT'Y & AG'T Patented June 4, 1946

2,401,707

UNITED STATES PATENT OFFICE 2,401,707

RANGE FINDER

Joseph Mihalyi and Stephen M. MacNeille, Rochester, N. Y., assignors to Eastman Kodak Company, Rochester, N. Y., a corporation of New Jersey Application March 13, 1943, Serial No. 479,099

6 Claims. (Cl. 88—2.7)

This invention relates to range finders. It is one of a series relating to this same subject which series includes the following:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,186 | Oct. 29, 1943 | MacNeille. |

The present invention has for its objects, the provision of a simple range correction setting device which is operable during ranging and thus is useful in modern warfare whereas previous range correction setting systems prevented accurate readings being taken rapidly. This range correction setting system is not strictly speaking an autocollimating system in the narrowest sense of the term like the range finders described in Case A of this series. However, since the present system does permit zero adjustment continuously while ranging, it is effectively autocollimating, and hence, the latter term is often used to describe the principle involved.

According to the invention a range finder of either the stereo or coincidence type (i. e. one having two horizontally spaced viewing points at which light beams are received from an object being ranged and having an optical system for directing and focusing the beams to form images in comparison planes and also having light deviating means in one of the object beams) is provided with a pair of adjustment coincidant marks. One of these marks is at least optically in each of the comparison planes, that is, it is either in the plane itself or a real or virtual image of it is in the plane. In coincidence range finders, the comparison planes are, of course, coplanar. Further according to the invention there is provided means for projecting through the optical system of the range finder while ranging, but not through the light deviating means, light from one of the marks to form an image thereof adjacent to the other mark. The marks are so arranged that this image and this other mark are in coincidence only when the instrument is in proper adjustment. That is, when the instrument is in proper adjustment, the marks are conjugate to one another with respect to the optical system. The term horizontal as used above is just relative and is used with reference to the optical system. Similarly, the marks are vertical which means effectively vertical relative to the viewing points although they may have any orientation in space.

Preferably, the mark image and the other mark are in one of the comparison planes itself and are visible through the viewing means provided for viewing the object images. In the preferred embodiment, an additional light deviator is included to intercept both the mark beam and one of the object beams for zero adjustment. For example, the operator may operate the range adjuster with his right hand to bring the object images into coincidence and at the same time, if lack of coincidence between the adjustment coindicant marks is indicated, he can make a zero adjustment with an auxiliary light deviator operated by his left hand.

The extraordinarily important advantages of this form of range correction setting device, will be fully apparent from the following description when read in connection with the accompanying drawing, in which:

Fig. 1 is a plan view of a coincidence range finder incorporating the invention, Fig. 1A being the view through the eyepiece of the instrument;

Fig. 2 is a plan view of a stereo range finder incorporating the invention, Fig. 2A being the binocular view through the eyepiece of the instrument;

Fig. 3 shows a detail alternative to that shown in Fig. 1 to permit an auxiliary observer to control the range correction setting while the main observer is ranging, Fig. 3A being the field of view of the auxiliary observer.

In Fig. 1 light from the object being ranged is received at spaced viewing points and directed by pentaprisms 10 through objectives 11 to strike crossed reflectors 12. This optical system forms object images in coplanar comparison planes 20 which may be viewed through an eyepiece 13 by the eye 14 of an observer. The object images are brought into coincidence by adjusting a light deviator 15 which operates a scale (not shown) in the normal way.

As best shown in Fig. 1A the comparison planes 20 are provided with adjustment coindicant marks 16 and 17. The mark 16 is illuminated by a lamp 18 and a prism 19. It consists of a vertical line. The mark 17 consists of two diamond shaped spots which are considered to constitute a single vertical mark, since it is the space between these two diamond marks which is brought into coincidence with an image 16' of the mark 16.

According to the invention, light from the mark 16 is collimated by the right hand objective 11 and after reflection in the penta prism 10 is picked up by a small penta prism 21 which does not interfere appreciably with the object beam coming through the light deviator 15. The mark beam is reflected by this small optical square 21 to a similar one 22 located at the other viewing point and thence back through the range finder optical system to be focused by the left hand objective 12 to form image 16' in the comparison plane. The image 16' and the mark 17 are visible alongside the object images 23 while ranging. As long as the image 16' stays accurately between the diamond spots 17, the operator knows that the instrument is in proper adjustment and hence that the light deviator 15 gives the proper reading or, if the reading is fed mechanically into a fire director, controls the fire director properly. On the other hand, if 16' is to one side of the adjustment coindicant mark 17, this maladjustment may be corrected by adjusting a zero adjuster 24 in the form of mutually rotatable wedges which intercept both the mark beam and one of the object beams. It will be noted that the main light deviator 15 does not intercept the mark beam and hence the range correction setting is independent of the setting of the deviator 15. Similarly, it will be noted that the optical system for projecting the image 16' includes all of the range finder optical system for directing and focusing the object images without interfering with the normal functioning of this range finder system.

In Fig. 2 a stereo range finder receives the object beams on optical squares 30 and focuses them by objectives 31 to form images in comparison planes 32 and 33 which are near the surface of field lenses. These object images 34 and 35 as seen in Fig. 2A are viewed stereoscopically through prisms 36, relay lenses 37, rhombs 38, and eyepieces 39 by the eyes 40 of an observer. The comparison planes 32 and 33 are provided with reticle marks 41 which have an apparent reticle mark distance. By means of a light deviator 42 one of the object images is moved horizontally relative to the other one to make the apparent object distance match the apparent mark 41 distance.

According to the invention, light from a lamp 45 is reflected by a prism 46 to illuminate a range correction setting mark 47 and light from this mark is collimated by the right hand objective 31, reflected by the optical square 30 and is picked up by a small penta prism 48 at the right viewing point to be reflected to a similar one 49 at the left viewing point and thence back through the left hand system to form an image 47' in the comparison plane 32. As long as this mark image 47' falls between diamond spots 50 the observer knows that the instrument is in proper adjustment. If the instrument gets out of adjustment, it may be corrected by operating a zero adjuster 51 which intercepts both the mark beam and one of the object beams, to bring the image 47' into coincidence, i. e. between the diamond spots 50.

In Fig. 3 the crossed reflectors 12 are provided respectively with small prisms 60 and 61 cemented to the reflecting surfaces. An auxiliary reticle plane 62 in the optical equivalent of the comparison planes 20, i. e. at the same optical distance from the objectives 11, is located behind the crossed reflectors 12. A mark 63 is illuminated by a lamp 64 and light from this mark is reflected by the prism 60 into the right hand side of the range finder system. After this mark beam makes the round trip described in connection with Fig. 1, the light enters the small prism 61 and is reflected into focus forming an image 63' in the auxiliary reticle plane 62 in coincidence with diamond spots 65. If the range finder gets out of adjustment, this image 63' moves to one side at which time the auxiliary observer must operate the zero adjuster 24 shown in Fig. 1 until the mark image and other mark are in coincidence again. Obviously, Fig. 1 is preferable since only a single observer is needed and since experience has shown that ranging on a moving object such as an aeroplane is not easy if some auxiliary observer is continually changing the adjustment of the finder. Of course, as long as the instrument stays in adjustment, no such change is required but in this case there is no point whatsoever in having an auxiliary observer made aware of this fact.

Having thus described the preferred embodiments of our invention, we wish to point out that it is not limited to these structures but is of the scope of the appended claims.

What we claim and desire to secure by Letters Patent of the United States is:

1. A range finder of the type having two horizontally spaced viewing points at which light beams are received from an object being ranged, an optical system for directing and focusing the beams to form images in comparison planes, means for viewing the images and light deviating means for moving one of the object images horizontally relative to the other said range finder being characterized by a pair of adjustment coindicant marks, one at least optically in each plane and means for projecting through said optical system while ranging but not through the light deviating means light from one of the marks to form an image thereof adjacent to the other mark, said marks being vertical and effectively conjugate to one another with respect to said projecting and image forming means when said optical system is in proper adjustment whereby lack of coincidence between the mark image and the other mark is indicative of maladjustment independent of the setting of the light deviating means and means simultaneously for correcting the adjustment of the optical system and bringing the mark image and other mark into coincidence.

2. A range finder according to claim 1 and of the stereo type in which the planes are separate, the marks are in the planes and the mark image and adjacent mark can be seen only by one eye.

3. A range finder according to claim 1 and of the coincidence type in which the planes are coplanar and the mark image and adjacent mark are visible adjacent to the object images through said viewing means.

4. A range finder according to claim 1 in which said adjustment correcting means is an additional light deviator included to intercept both the mark beam and one of the object beams.

5. In a range finder having comparison planes, an optical system for forming in those planes images of the object being ranged and means for deviating one image relative to the other, the subcombination of a pair of adjustment coindicant elements in the planes, means including the optical system and excluding said deviating means for projecting an image of one element into coincidence with the other element only when said system is in proper adjustment and means simultaneously for correcting the system adjustment and for bringing the element image and other element into coincidence.

6. A range finder of the type having two horizontally spaced viewing points at which light beams are received from an object being ranged, an optical system for directing and focusing the beams to form images in comparison planes, means for viewing the images and light deviating means for deviating one of the object beams horizontally, said range finder being characterized by one adjustment coindicant mark at least optically in one of the planes and another mark in the other plane visible through the viewing means, means for projecting light from said one mark through said optical system and while collimated from one viewing point to the other, into focus adjacent to the other mark, said light deviating means being outside the mark light beam, and an auxiliary light deviator intercepting both the mark beam and one of the object beams to adjust the mark image into coincidence with said other mark, the first mentioned light deviating means being correctly calibrated for the range finder when said coincidence exists.

JOSEPH MIHALYI.
STEPHEN M. MacNEILLE.